United States Patent
Berry et al.

(10) Patent No.: US 12,418,415 B2
(45) Date of Patent: Sep. 16, 2025

(54) MULTIFACTOR AUTHENTICATION VIA BIFURCATED PASSCODE AND NON-FUNGIBLE TOKEN

(71) Applicant: BANK OF AMERICA CORPORATION, Charlotte, NC (US)

(72) Inventors: Anna Kristen Pingel Berry, Indian Land, SC (US); Shweta Ambulkar, Plainsboro, NJ (US); Benjamin Daniel Hardman, Harrisburg, NC (US); Angela Ianni, Lincoln, RI (US); Ravi Joshi, Pennington, NJ (US); Olga Kocharyan, Matthews, NC (US); Luqman Sharief, Libertyville, IL (US); Michael Wm. Whitaker, Fort Worth, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 544 days.

(21) Appl. No.: 17/953,028

(22) Filed: Sep. 26, 2022

(65) Prior Publication Data

US 2024/0106649 A1 Mar. 28, 2024

(51) Int. Cl.
*H04L 9/00* (2022.01)
*H04L 9/32* (2006.01)

(52) U.S. Cl.
CPC .......... *H04L 9/3213* (2013.01); *H04L 9/3226* (2013.01); *H04L 9/3236* (2013.01)

(58) Field of Classification Search
CPC .... H04L 9/3213; H04L 9/3226; H04L 9/3236

USPC ........................................................ 713/172
See application file for complete search history.

(56) References Cited

U.S. PATENT DOCUMENTS

| | | | |
|---|---|---|---|
| 8,321,678 B2 | 11/2012 | Hofmann et al. |
| 8,689,290 B2 | 4/2014 | Buer |
| 8,707,029 B2 | 4/2014 | Brand et al. |
| 8,756,423 B2 | 6/2014 | Djordjevic et al. |
| 8,862,872 B2 | 10/2014 | Vanderveen et al. |
| 8,898,453 B2 | 11/2014 | Preiss et al. |
| 8,913,995 B2 | 12/2014 | Vanderveen et al. |
| 9,071,963 B2 | 6/2015 | Khan et al. |
| 9,270,663 B1 | 2/2016 | Kravitz et al. |
| 9,521,548 B2 | 12/2016 | Fosmark et al. |

(Continued)

*Primary Examiner* — Christopher J Brown
(74) *Attorney, Agent, or Firm* — Moore & Van Allen PLLC; Nicholas C. Russell

(57) ABSTRACT

Multifactor user authentication leveraging secure tokenization, such as a Non-Fungible Token (NFT) and multiple passkeys (e.g., bifurcated passkey). One or more authentication NFTs are generated that use some form of a user's authentication credentials as the seed input for the NFT encryption/hash algorithm(s). In addition, passkeys are distributed to and/or made accessible to multiple passkey holders. In response to an event that requests multifactor authentication of the user, a plurality passkeys are requested, received and verified. Each of the passkeys being requested and received from, or at the directive of, one of the multiple passkey holders. In response to verifying the plurality of passkeys, at least one of the authentication NFTs is accessed and the cryptographic hash algorithm(s) is implemented to decrypt the authentication NFT(s) and identify the one or more user credentials. In response, the user is authenticated based at least on the user credentials that formed the basis for the authentication NFT(s).

20 Claims, 10 Drawing Sheets

(56) References Cited

U.S. PATENT DOCUMENTS

| | | | |
|---|---|---|---|
| 9,578,025 B2 | 2/2017 | Pinski et al. | |
| 10,771,263 B2 | 9/2020 | Smith et al. | |
| 10,817,875 B2 | 10/2020 | Makhotin et al. | |
| 11,188,901 B2 | 11/2021 | Karpenko et al. | |
| 11,308,487 B1 | 4/2022 | Foster et al. | |
| 11,757,640 B2 | 9/2023 | Ferenczi | |
| 11,907,939 B2 | 2/2024 | Cramer | |
| 2010/0010932 A1 | 1/2010 | Law et al. | |
| 2014/0189799 A1 | 7/2014 | Lu | |
| 2017/0163629 A1 | 6/2017 | Law et al. | |
| 2019/0043022 A1 | 2/2019 | Fosmark et al. | |
| 2019/0392407 A1 | 12/2019 | Keskar | |
| 2020/0097948 A1 | 3/2020 | Sheets et al. | |
| 2020/0169410 A1* | 5/2020 | Wainblat | H04L 9/14 |
| 2021/0409956 A1 | 12/2021 | Wagner | |
| 2022/0222364 A1 | 7/2022 | Roberts | |
| 2022/0300966 A1 | 9/2022 | Andon | |
| 2022/0398340 A1 | 12/2022 | Jakobsson | |
| 2023/0034169 A1 | 2/2023 | Ferenczi | |
| 2023/0034621 A1 | 2/2023 | Pardo | |
| 2023/0086191 A1 | 3/2023 | Jakobsson | |
| 2023/0117430 A1 | 4/2023 | Quigley | |
| 2023/0144857 A1 | 5/2023 | Khan | |
| 2023/0182025 A1 | 6/2023 | Benedetto | |
| 2024/0070305 A1* | 2/2024 | Jurat | G16Y 20/40 |

\* cited by examiner

MULTIFACTOR AUTHENTICATION VIA BIFURCATED PASSCODE AND NON-FUNGIBLE TOKEN

FIELD OF THE INVENTION

The present invention is related to multifactor user authentication and, more specifically, leveraging the use multiple passkeys in possession of different users and secure tokenization, such as a Non-Fungible Token (NFT) for purposes of authenticating/authorizing a user.

BACKGROUND

In many instances, presentation of conventional user credentials may not be adequate to ensure that a user authentication process is verifiable. In this regard, merely providing a previously stored password or, some instances, biometric data may not be adequate if the password and/or biometric data has been compromised or if the underlying event requiring user authentication calls for heightened user credentials (i.e., a multifactor authentication/authorization process).

Instances in which presentation of conventional user credentials may not be adequate to ensure verifiability of the user authentication process include, but are not limited to, remotely resetting user credentials on a mobile device or otherwise resetting user credentials when other authentication means are inadequate or unavailable, applying for or renewing a an account or a Virtual Private Network (VPN) certificate, providing elevated access rights to data or functionality, initiating a transaction that exceeds a predetermined amount or in which suspicious activity has been detected.

Bifurcated or multi-component passkeys may be required when more than one individual is required to provide authorization for an individual or entity to conduct an event. For example, if the individual conducting the event is a minor, elder, incapacitated or the like or if the entity is an estate. A need may exist to have multiple individuals present their assigned passkeys as a means of authorizing the individual or entity to conduct the event and/or occurrence of further actions related to the event.

Therefore, a need exists to develop systems, methods and the like that would provide for a highly secure and defensible means for user authentication and, more specifically multifactor user authentication.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by leveraging secure tokenization, such as a Non-Fungible Token (NFT) and multiple passkeys (e.g., bifurcated passkey) for implementation of multifactor user authentication. In this regard, one or more authentication NFTs are generated that use some form of a user's authentication credentials (e.g., KYU/KYC data, biometric data, and the like) as the seed input for the NFT encryption/hash algorithm(s). In addition, passkeys are distributed to and/or made accessible to multiple users (e.g., the user being authenticated as well as one or more other users or, in other instances, multiple users other than the user being authenticated). The number of passkeys distributed and/or made accessible to the multiple users may be at the discretion of the user being authenticated.

In response to an event that requests multifactor authentication of the user, a plurality passkeys are requested, received and verified. Each of the passkeys being requested and received from, or at the directive of, one of the multiple users. In response to verifying the plurality of passkeys, at least one of the authentication NFTs is accessed and the cryptographic hash algorithm(s) is implemented to decrypt the authentication NFT(s) and identify the one or more user credentials. In response, the user is authenticated based at least on the user credentials that formed the basis for the authentication NFT(s).

In specific embodiments of the invention, receipt and verification of the passkeys prompts are determination as to whether volume or percentage passkey requirements or specific user requirements have been met before the authentication NFT(s) are accessed. For example, the passkeys may be required to be received/verified from a certain specified number of passkey holders or a certain percentage of the passkey holders. Moreover, in another specific example, one or more specific passkey holders may be required to be received and verified. In specific embodiments of the invention, the volume or percentage of passkey holders and/or the specific passkey holders may be determined dynamically at the time of the event requiring user authentication based on parameters associated with the event and/or timing of use of passkeys in previous multifactor user authentications.

In specific embodiments of the invention, a plurality of NFTs is generated that are associated with the user. In such embodiments of the invention each NFT may be associated with a passkey holder and/or a passkey. In specific such embodiments of the invention, each of the plurality of authentication NFTs are generated with a distinct portion of the user credentials as at least a portion of the input to the cryptographic NFT-generating algorithms. In such embodiments of the invention, during the authentication process, once the passkeys are received and verified, each of plurality of authentication NFTs are accessed, decrypted to identify their respective portion of the authentication credentials and the authentication credentials are subsequently assembled from the portions and used for purposes of authentication.

In other specific embodiments of the invention, the authentication NFT(s) may be stored either on a user's device, at a network location or on a private distributed trust computing network. In those embodiments in which the authentication NFT(s) are stored at a network location the network location may be included within the metadata stored at a private distributed trust network or identified within at least one of the received passkeys.

In still further specific embodiments of the invention, the authentication NFTs may be generated in a deactivated state. For example, the authentication NFTs may be further encrypted via a key wrapping process or the like. In such embodiments of the invention, the authentication NFTs are stored in the deactivated state and require activation, such as decryption, once the authentication NFTs have been accessed, for purposes of user authentication. In such embodiments of the invention, the authentication NFTs may remain in the activated state for a predetermined period of time or for a predetermined number of uses after which the authentication NFTs may automatically revert back to the deactivated state (e.g., automatically implement the key wrapping process or the like), while in other embodiments of the invention the user or some other entity must take an overt action to deactivate the authentication NFT.

A system for multifactor user authentication defines first embodiments of the invention. The system includes a first computing platform having a first memory and one or more first processing devices in communication with the first memory. The first memory stores an authentication Non-Fungible Token (NFT) generator, which includes one or more cryptographic NFT-generating algorithms, and is executable by at least one of the one or more first processing devices. The authentication NFT generator is configured to receive one or more user credentials associated with the user and generate one or more authentication NFTs for the user. The authentication NFT(s) are generated using the user credentials as at least a portion of the input to the one or more cryptographic NFT-generating algorithms.

The system additionally includes a second computing platform having a second memory and one or more second processing devices in communication with the second memory. The second memory stores a multifactor authentication application that is executable by at least one of the one or more second processing devices. The multifactor authentication is configured to, in response to a request for authentication of the user, receive and verify a plurality of predetermined passkeys. Each of the plurality of predetermined passkeys are received from, or at a directive of, one of a plurality of users (i.e., designated passkey holders). In response to verifying the plurality of predetermined passkeys, the multifactor authentication application is configured to access at least one of the one or more authentication NFTs, implement the one or more cryptographic algorithms to decrypt the at least one of the one or more authentication NFTs and identify the one or more user credentials. In response to identifying the one or more user credentials, the authentication application is further configured to authenticate the user based at least on the one or more user credentials.

In specific embodiments of the system, the plurality of users (i.e., the designated passkey holders) are chosen from group consisting of (i) users other than the user being authenticated, and (ii) the user being authenticated and users other than the user being authenticated.

In other specific embodiments of the system, the multifactor authentication application is further configured to, in response to receiving and verifying the predetermined passkeys, determine that the received and verified predetermined password meet at least one chosen from the group comprising (i) passkey volume or percentage requirements (i.e., a specified number of passkeys or specified percentage of the allocated passkeys), and (ii) specific users from the plurality of users requirements, and, in response to verifying the plurality of predetermined passkeys and determining that at least one of (i) and (ii) have been met, access the one or more authentication NFTs, implement the one or more cryptographic algorithms to decrypt the one or more authentication NFT and identify the one or more user credentials. In related embodiments of the system, the multifactor authentication application is further configured to dynamically determine at least one of (i) the passkey volume or percentage requirements, and (ii) the specific users from the plurality of users requirements based on at least one of (a) one or more parameters associated with an action/event prompting the multifactor authentication of the user, and (b) use of the predetermined passkeys in previous multifactor authentications of the user.

In further specific embodiments of the system, the multifactor authentication application is further configured at least one of the received passkeys is configured to identify at least one network location for accessing the at least one authentication NFT, and the at least one authentication NFT is accessed based on the identified at least one network location.

In other specific embodiments of the system, the authentication NFT generator is further configured to generate a plurality of authentication NFTs for the user, wherein each of the plurality of authentication NFTs is associated with one of the plurality of passkeys. In related embodiments of the system, each of the plurality of authentication NFTs are generated using a distinct portion of the one or more user credentials as at least a portion of an input to the one or more cryptographic NFT-generating algorithms. In such embodiments of the system, the multifactor authentication application is further configured to, in response to verifying the plurality of predetermined passkeys, access the plurality of authentication NFTs, implement the one or more cryptographic algorithms to decrypt the plurality of authentication NFT, identify the distinct portions of the one or more user credentials, assemble the distinct portions of the one or more user credentials to identify the one or more user credentials.

In additional specific embodiments the system further includes a private distributed trust computing network including a plurality of decentralized nodes. Each decentralized node has a third memory and at least one third processing device in communication with the third memory. The third memory of the decentralized nodes is configured to store one or more distributed ledgers, with each distributed ledger including a plurality of data blocks. In response to the distributed trust computing network receiving at least one of (i) the one or more authentication NFTs, and (ii) metadata associated with the one or more authentication NFTs, a plurality of the decentralized nodes is configured to verify authenticity of the one or more authentication NFTs, and store at least one of (i) the one or more authentication NFTs, and (ii) the metadata associated with the one or more authentication NFTs. In related embodiments of the invention, the metadata associated with each of the one or more authentication NFTs includes a network location at which a corresponding one of the one or more authentication NFTs is stored. In such embodiments of the system, the multifactor authentication is application is further configured to access the one or more authentication NFTs by identifying at least one location on the private distributed trust computing network at which the metadata associated with the one or more authentication NFTs is stored, and access the at least one location on the private distributed trust computing network to identify the network location at which the corresponding one of the one or more authentication NFTs is stored. In other related embodiments of the system, the authentication NFT generator is further configured to generate the one or more authentication NFTs in a deactivated state (i.e., an encrypted state provided for by key wrapping the one or more authentication NFTs) and communicate the one or more authentication NFTs in the deactivated state to the private distributed trust computing network. In such embodiments of the system the private distributed trust computing network is configured to store the NFTs in the deactivated state. In further related embodiments of the system, the multifactor authentication application is further configured to move the one or more authentication NFTs from the deactivated state to an activated state by decrypting the key wrapping of the one or more authentication NFTs.

A computer-implemented method for multifactor user authentication defines second embodiments of the invention. The computer-implemented method is executed by one or more computing processor devices. The method includes receiving one or more user credentials associated with the user and generating one or more authentication NFTs for the user. The one or more authentication NFTs are generated using the one or more user credentials as at least a portion of an input to one or more cryptographic NFT-generating algorithms. In response to a request for authentication of the user, the method further includes receiving and verifying a plurality of predetermined passkeys. Each of the plurality of predetermined passkeys received from or at a directive of one of a plurality of users. In response to verifying the plurality of predetermined passkeys, the method further includes accessing the one or more authentication NFTs, implementing the one or more cryptographic algorithms to decrypt the one or more authentication NFT, identifying the one or more user credentials, and authenticating the user based at least on the one or more user credentials.

In specific embodiments the computer-implemented method further includes determining that the received and verified predetermined password meet at least one chosen from the group comprising (i) passkey volume or percentage requirements, and (ii) specific users from the plurality of user requirements. In response to verifying the plurality of predetermined passkeys and determining that at least one of (i) and (ii) have been met, the method further includes accessing the one or more authentication NFTs, implementing the one or more cryptographic algorithms to decrypt the one or more authentication NFT and identifying the one or more user credentials.

In other specific embodiments of the computer-implemented method, generating one or more authentication NFTS further includes generating a plurality of authentication NFTs for the user. Each of the plurality of authentication NFTs is (i) associated with one of the plurality of passkeys and (ii) generated using a distinct portion of the one or more user credentials as at least a portion of an input to the one or more cryptographic NFT-generating algorithms. In such embodiments of the method, in response to verifying the plurality of predetermined passkeys, the method includes accessing the plurality of authentication NFTs, implementing the one or more cryptographic algorithms to decrypt the plurality of authentication NFT, identifying the distinct portions of the one or more user credentials, assembling the distinct portions of the one or more user credentials to identify the one or more user credentials.

In still further embodiments of the computer-implemented method, generating the one or more authentication NFTs further includes generating the one or more authentication NFTs in a deactivated state (i.e., an encrypted state provided for by key wrapping the one or more authentication NFTs). In such embodiments the computer-implemented method further includes communicating the one or more authentication NFTs in the deactivated state to the private distributed trust computing network. The private distributed trust computing network is configured to store the NFTs in the deactivated state.

A computer program product including a non-transitory computer-readable medium defines third embodiments of the invention. The computer-readable medium includes sets of codes for causing computing processing device(s) to receive one or more user credentials associated with the user and generate one or more authentication NFTs for the user. The one or more authentication NFTs are generated using the one or more user credentials as at least a portion of an input to one or more cryptographic NFT-generating algorithms. The computer-readable medium additionally includes sets of codes for causing the computing processing device(s) to, in response to a request for authentication of the user, receive and verify a plurality of predetermined passkeys, each of the plurality of predetermined passkeys received from or at a directive of one of a plurality of users. In response to verifying the plurality of predetermined passkeys, the sets of codes are further configured to cause the computer processing device(s) to access the one or more authentication NFTs, implement the one or more cryptographic algorithms to decrypt the one or more authentication NFT, identify the one or more user credentials, and authenticate the user based at least on the one or more user credentials.

In specific embodiments of the computer program product, the sets of codes further cause the one or more computing processor devices to determine that the received and verified predetermined password meet at least one chosen from the group comprising (i) passkey volume or percentage requirements, and (ii) specific users from the plurality of users requirements. In such embodiments of the computer program product the set of codes for causing the one or more computing devices to access the one or more authentication NFTs, implement the one or more cryptographic algorithms to decrypt the one or more authentication NFT and identify the one or more user credentials further cause the one or more computing device processors to, in response to verifying the plurality of predetermined passkeys and determining that at least one of (i) and (ii) have been met, access the one or more authentication NFTs, implement the one or more cryptographic algorithms to decrypt the one or more authentication NFT and identify the one or more user credentials.

In other specific embodiments of the computer program product, the set of codes for causing the one or more computing processor device to generate one or more authentication NFTs further cause the one or more computing device processors to generate a plurality of authentication NFTs for the user. Each of the plurality of authentication NFTs is (i) associated with one of the plurality of passkeys and (ii) generated using a distinct portion of the one or more user credentials as at least a portion of an input to the one or more cryptographic NFT-generating algorithms. Further, the set of codes for causing the one or more computing devices to access the one or more authentication NFTs, implement the one or more cryptographic algorithms to decrypt the one or more authentication NFT and identify the one or more user credentials further cause the one or more computing device processors to, in response to verifying the plurality of predetermined passkeys, accessing the plurality of authentication NFTs, implementing the one or more cryptographic algorithms to decrypt the plurality of authentication NFT, identifying the distinct portions of the one or more user credentials, assembling the distinct portions of the one or more user credentials to identify the one or more user credentials.

Thus, according to embodiments of the invention, which will be discussed in greater detail below, the present invention provides for multifactor user authentication leveraging secure tokenization, such as a Non-Fungible Token (NFT) and multiple passkeys (e.g., bifurcated passkey). In this regard, one or more authentication NFTs are generated that use some form of a user's authentication credentials as the seed input for the NFT encryption/hash algorithm(s). In addition, passkeys are distributed to and/or made accessible to multiple passkey holders. In response to an event that requests multifactor authentication of the user, a plurality passkeys are requested, received and verified. Each of the passkeys being requested and received from, or at the directive of, one of the multiple passkey holders. In response to verifying the plurality of passkeys, at least one of the authentication NFTs is accessed and the cryptographic hash algorithm(s) is implemented to decrypt the authentication NFT(s) and identify the one or more user credentials. In response, the user is authenticated based at least on the user credentials that formed the basis for the authentication NFT(s).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
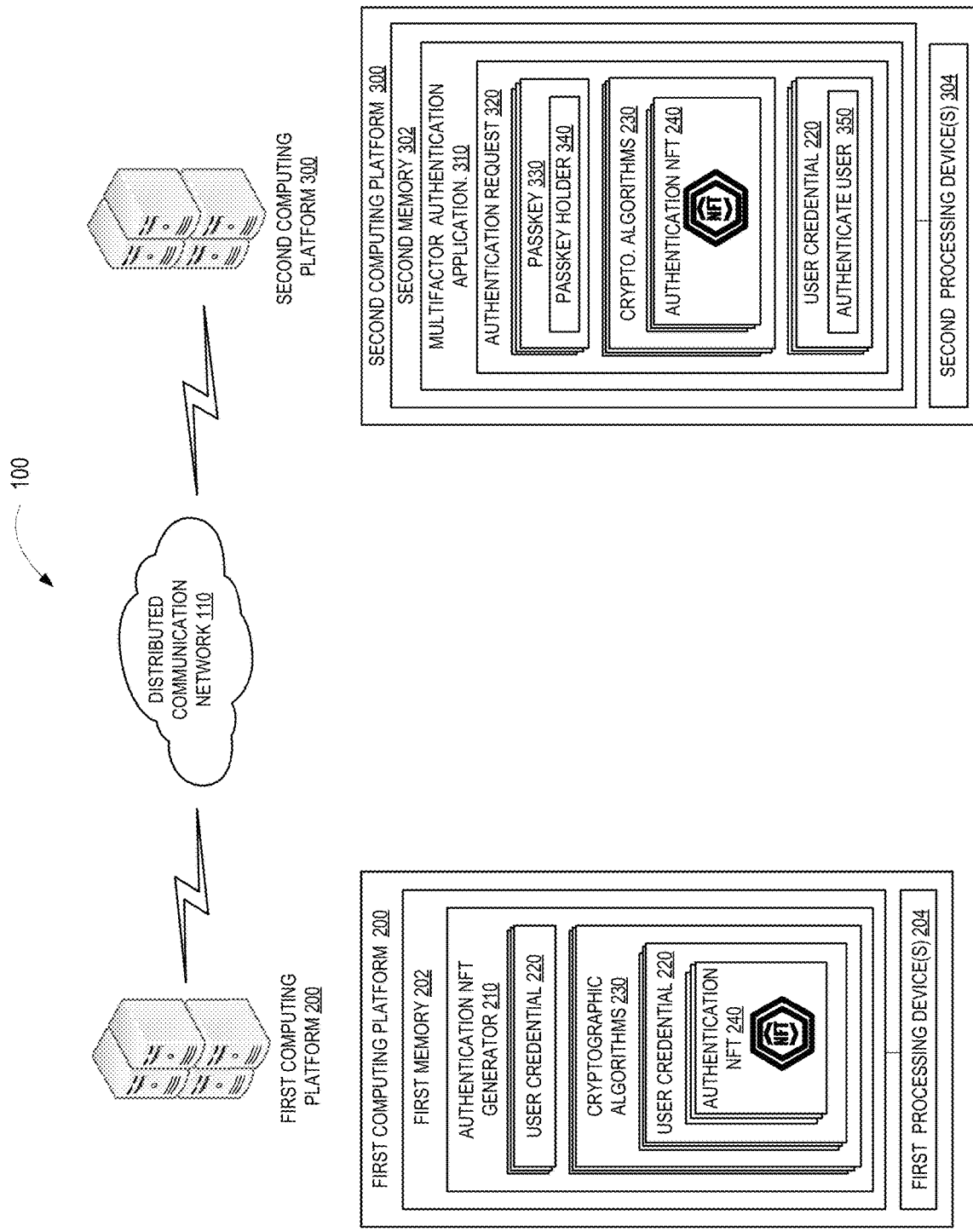
Figure 2:
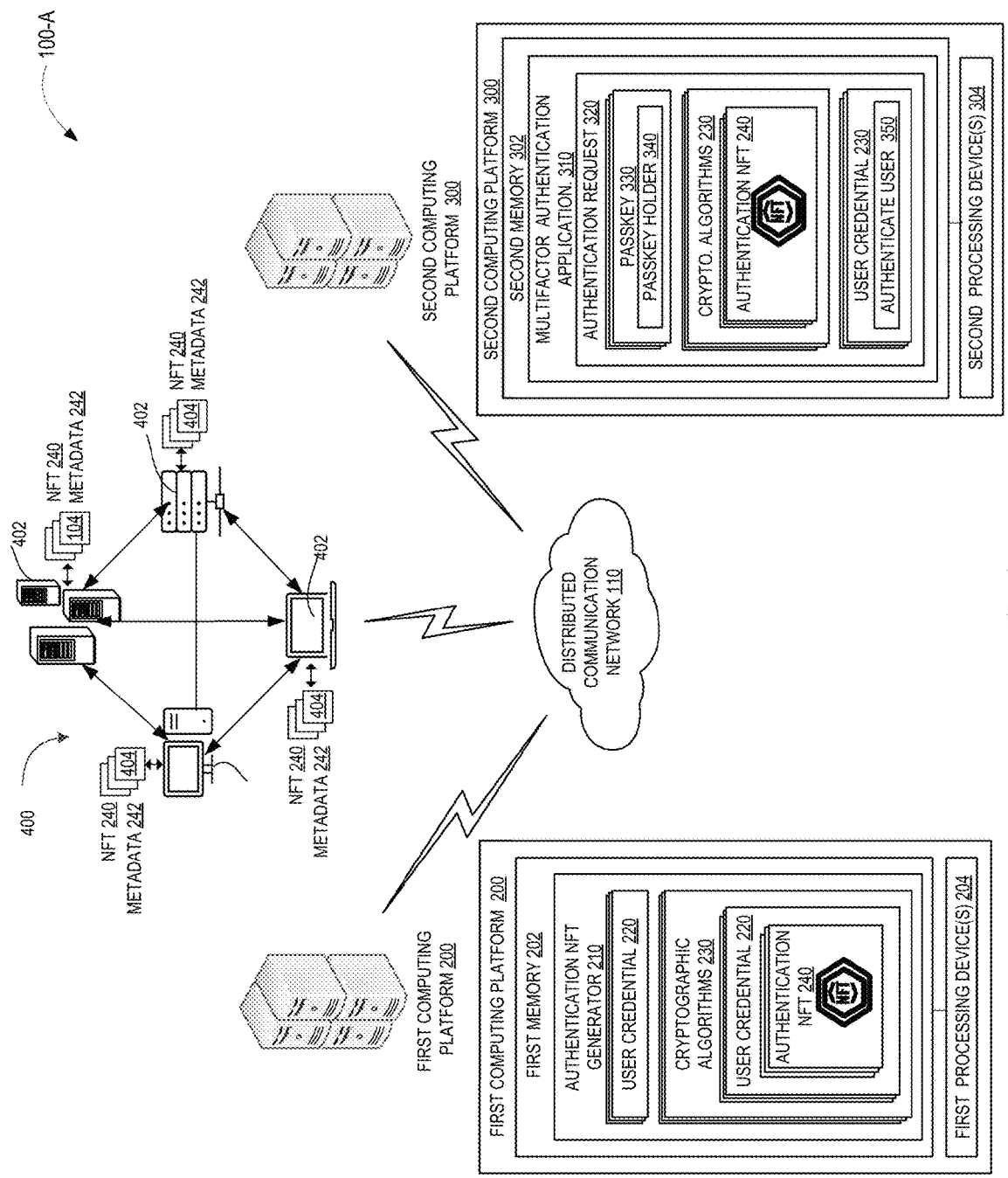
Figure 3:
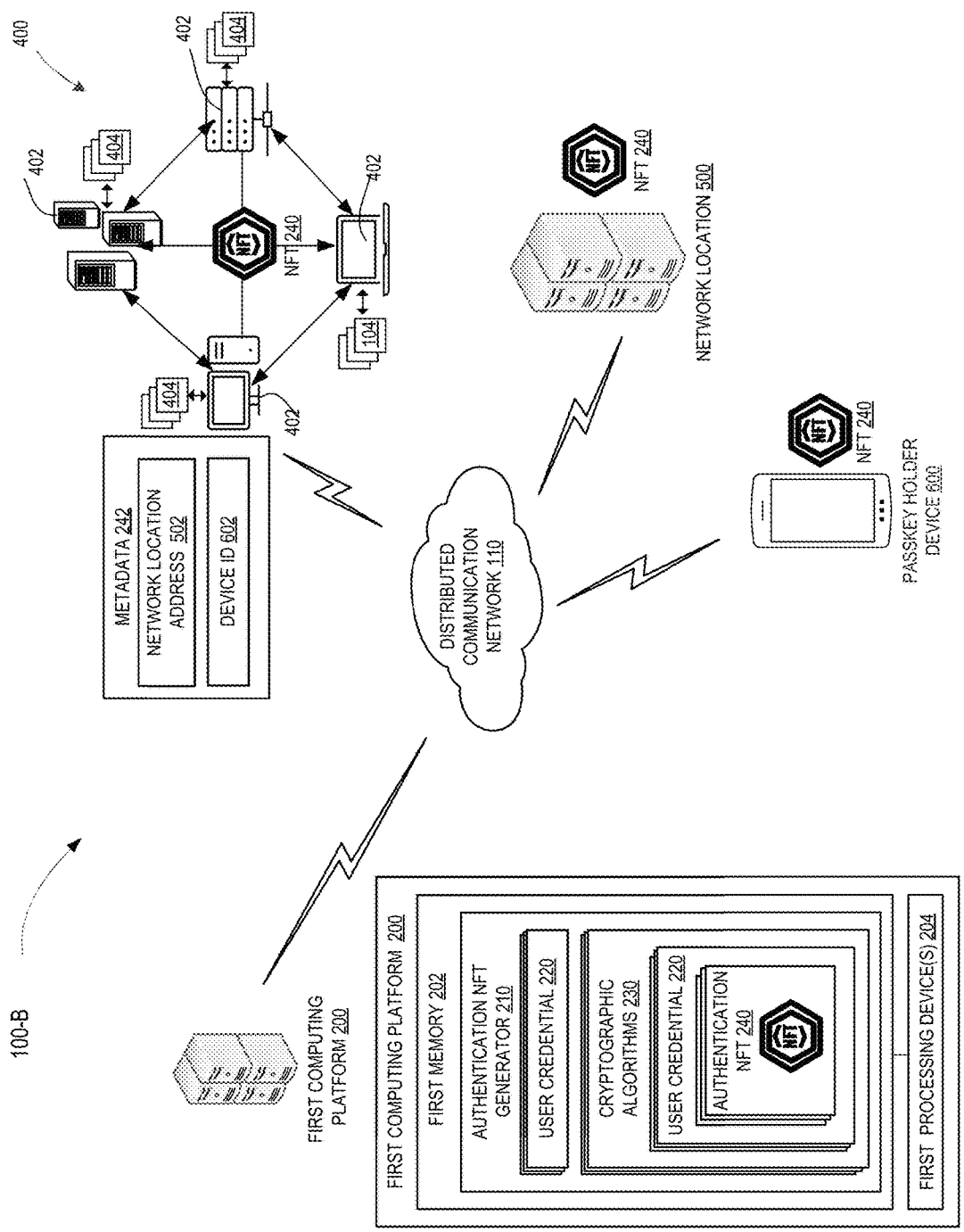
Figure 4:
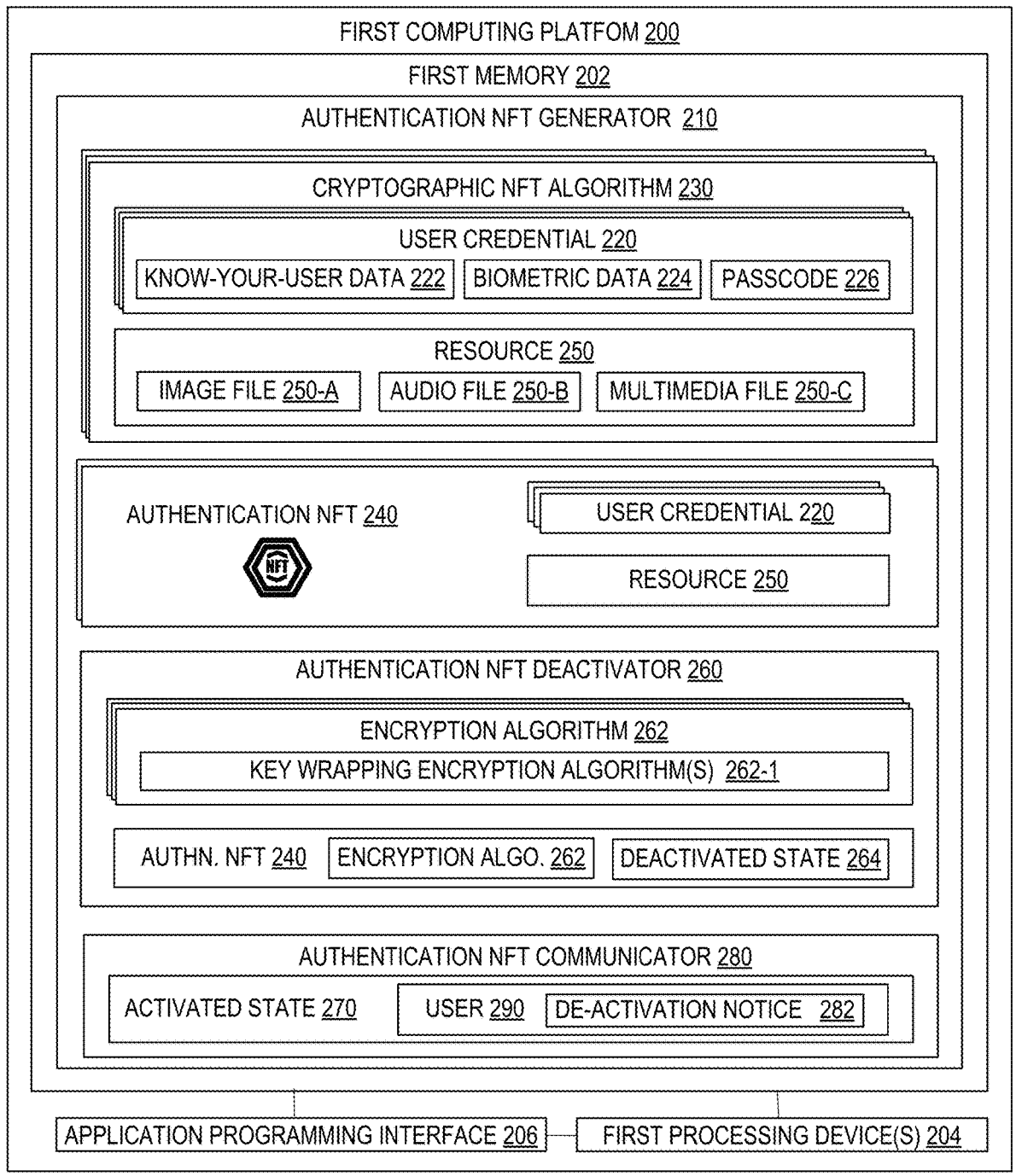
Figure 5:
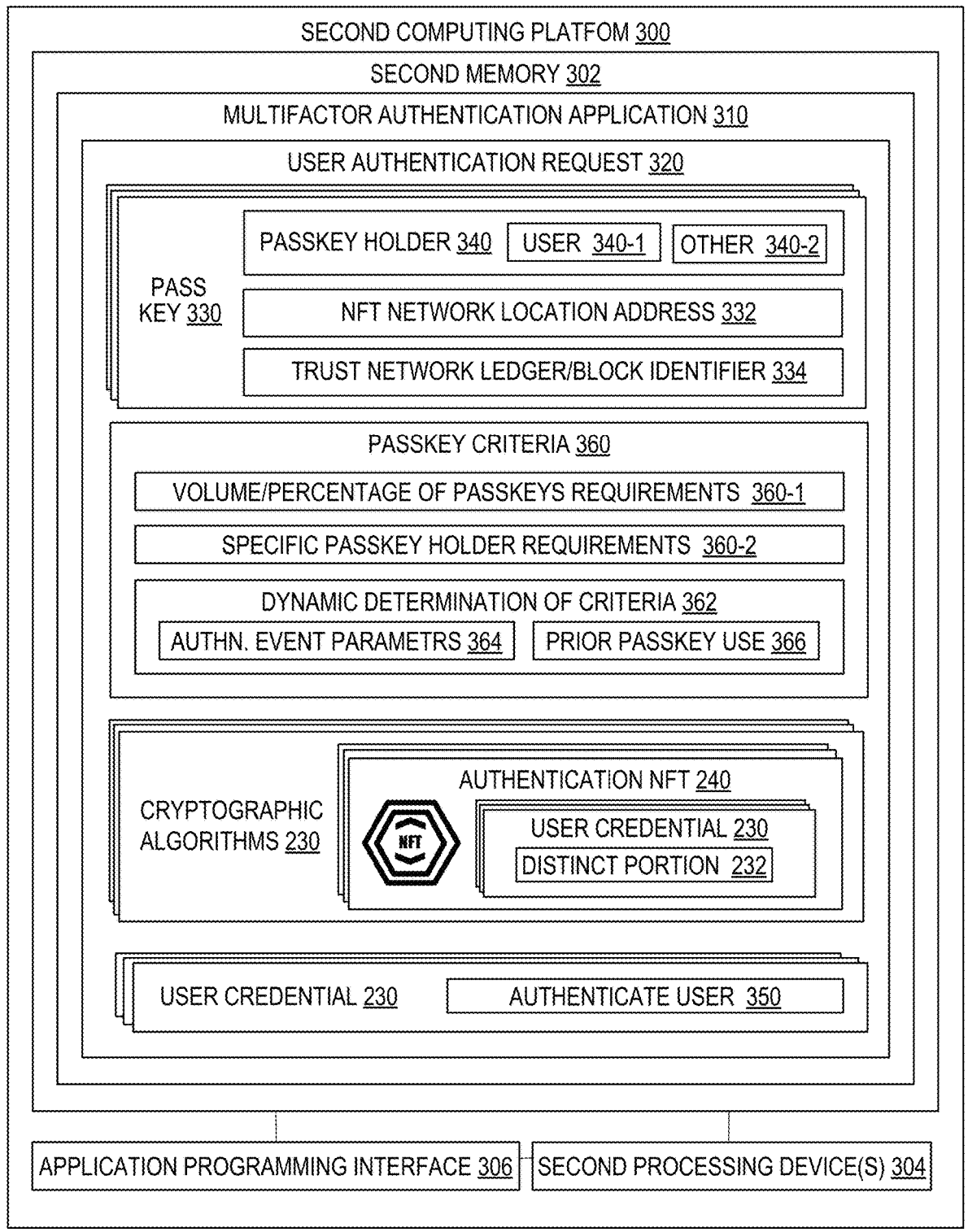
Figure 6:
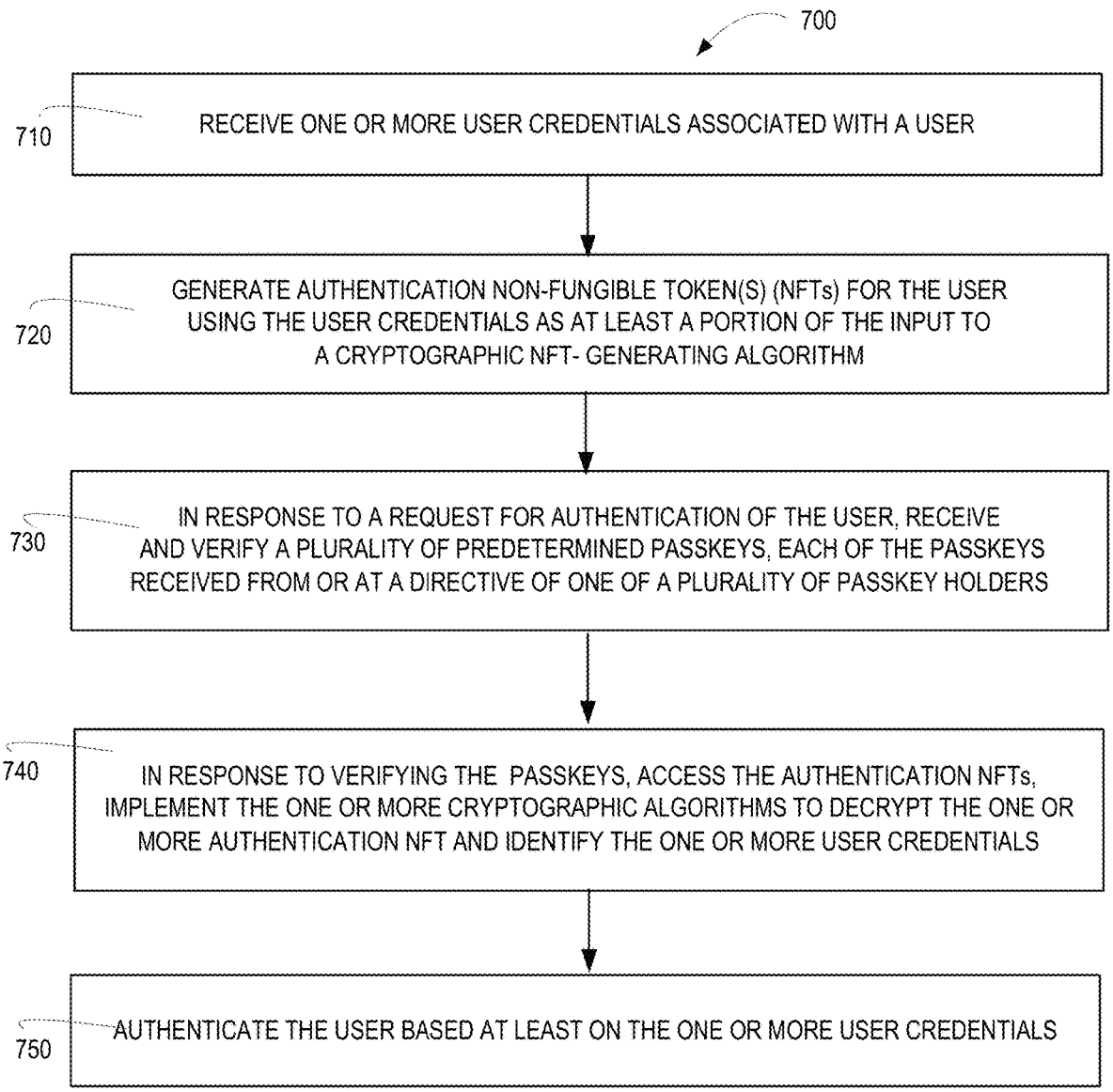
Figure 7:
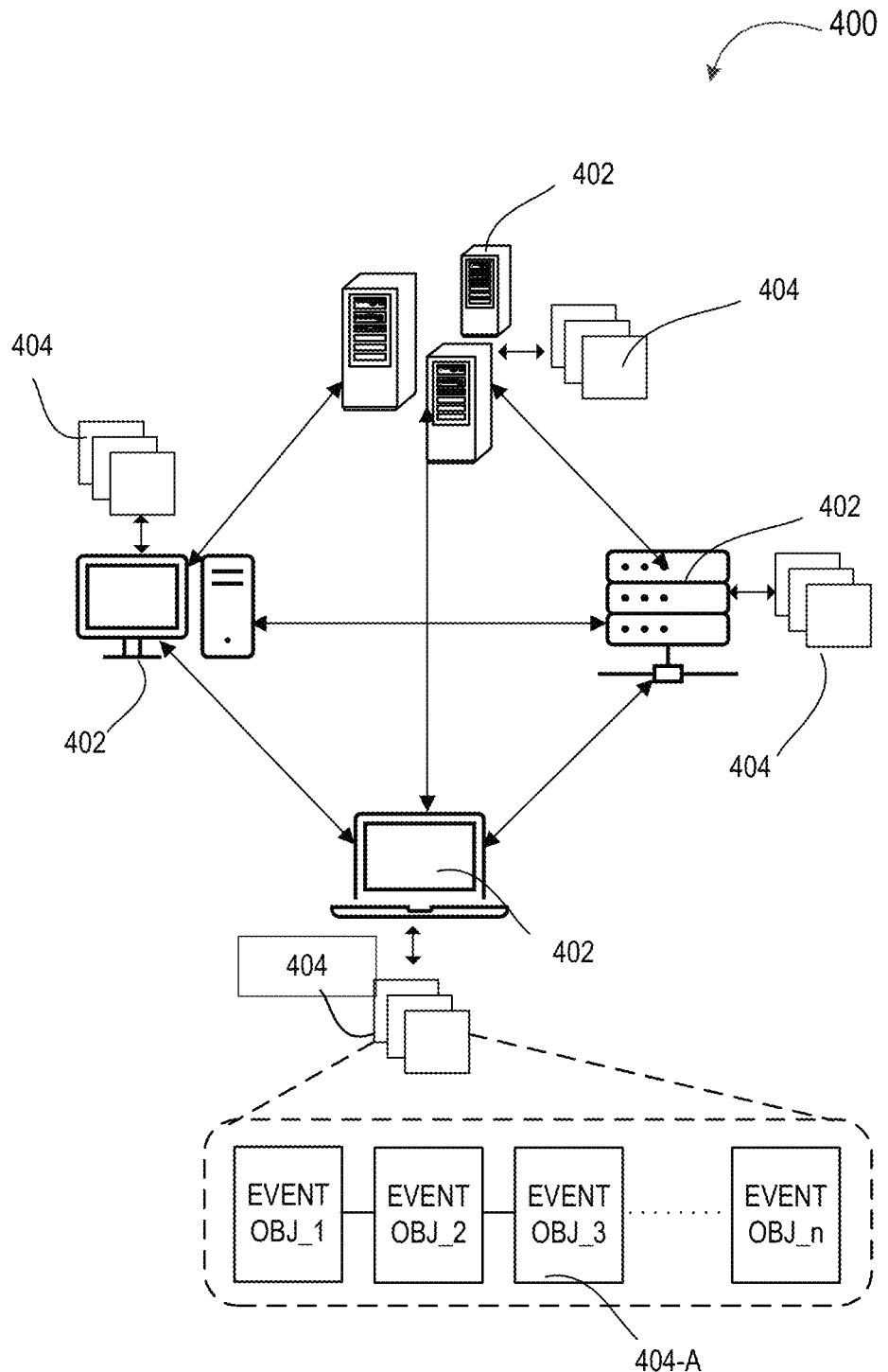
Figure 8:
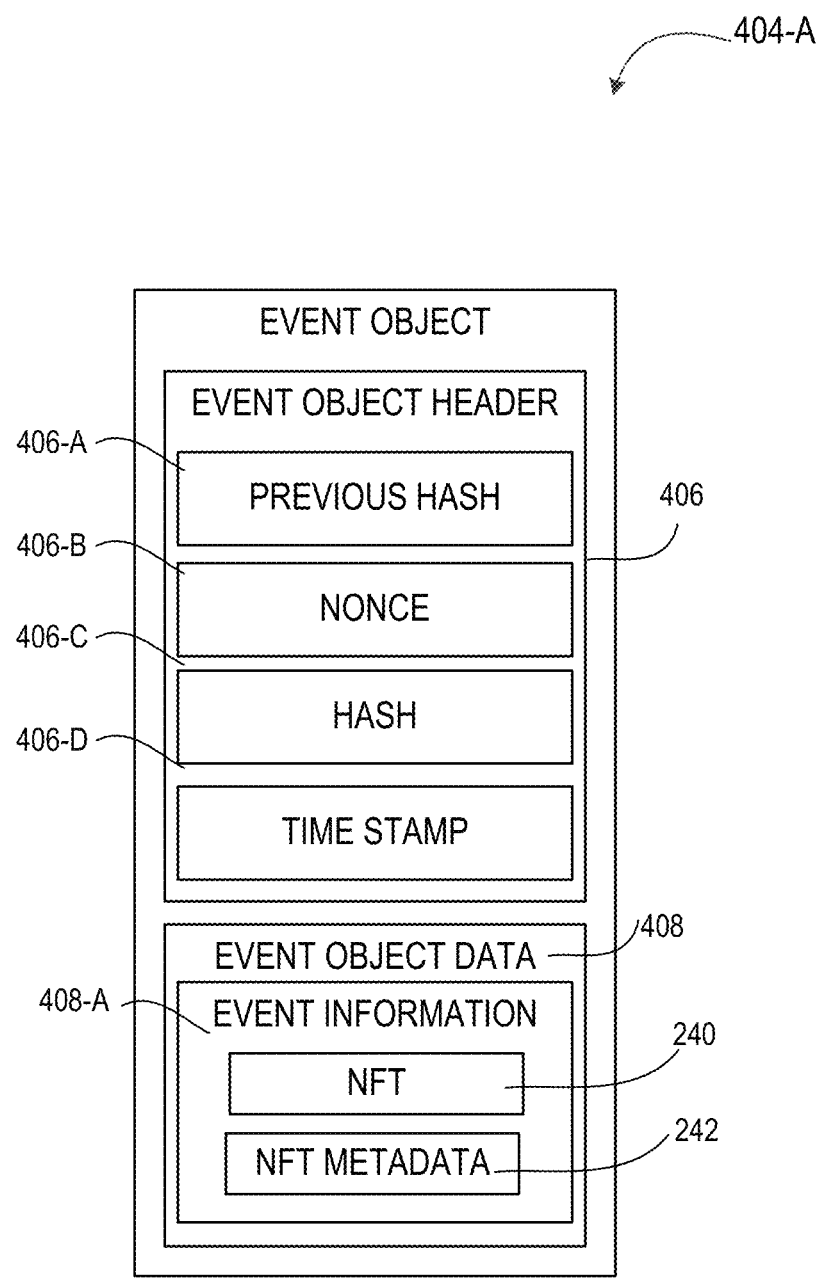
Figure 9:
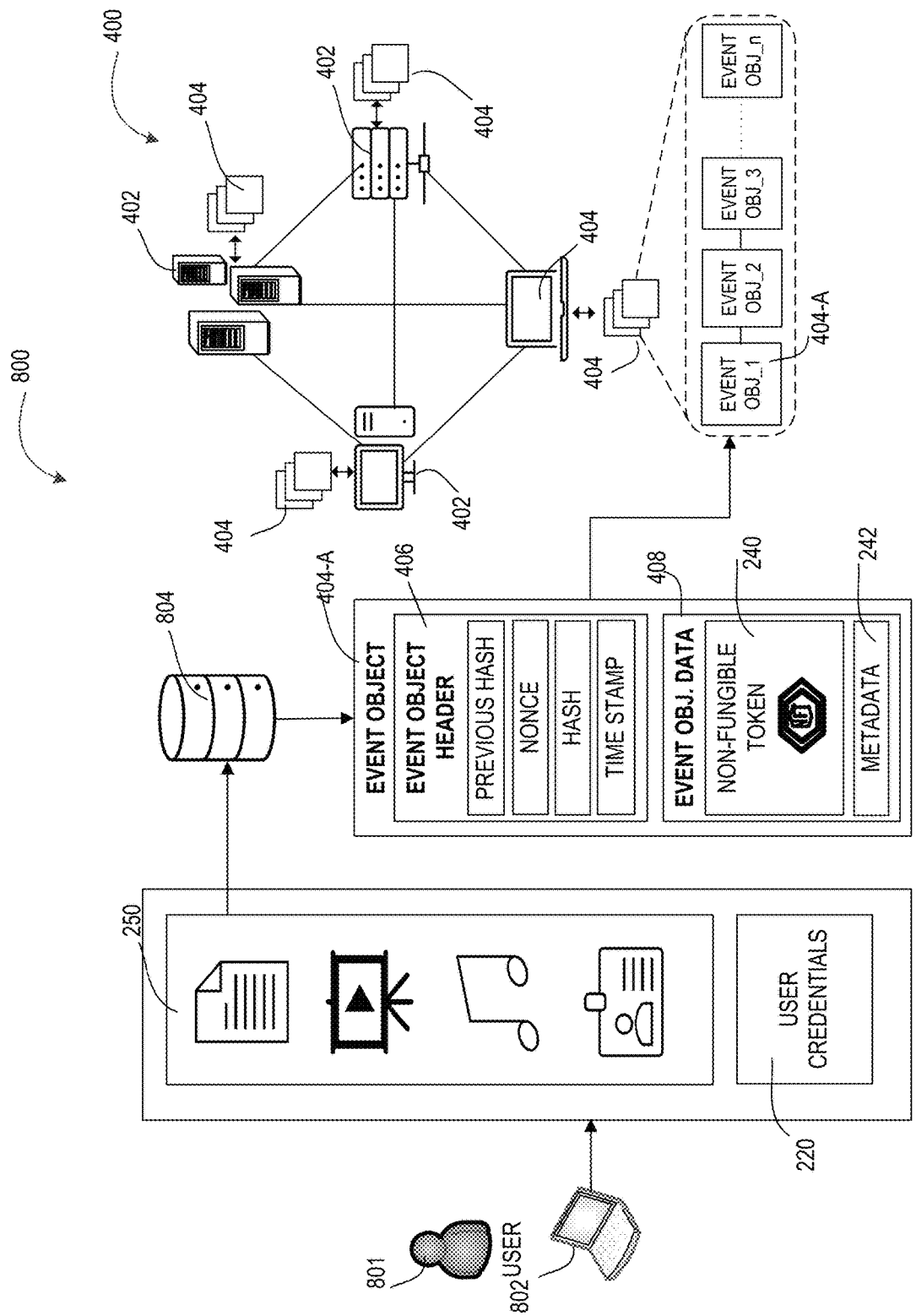
Figure 10:
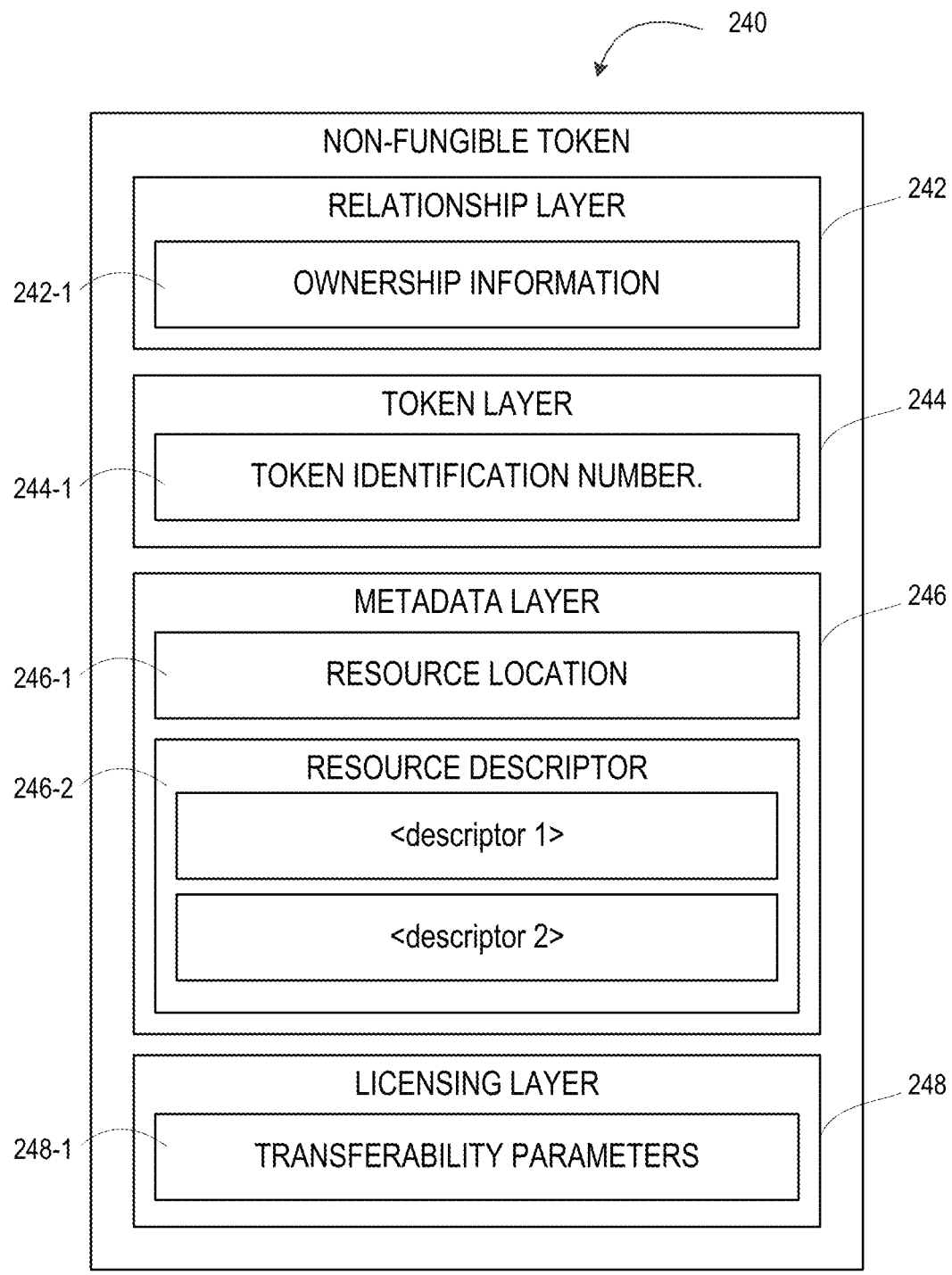

Having thus described embodiments of the disclosure in general terms, reference will now be made to the accompanying drawings, wherein:

FIG. 1 is a schematic/block diagram of a system for user authentication implementing authentication NFT(s) and multiple passkeys provided by multiple passkey holders, in accordance with embodiments of the present invention;

FIG. 2 is schematic/block diagram of a system for user authentication implementing authentication NFT(s) and multiple passkeys provided by multiple passkey holders, in which the NFTs and/or metadata associated with the NFTs is stored on a distributed trust computing network, in accordance with embodiments of the present invention;

FIG. 3 is schematic/block diagram of a system for user authentication implementing authentication NFT(s), in which the NFTs are capable of being stored on a distributed trust computing network, on a user device or at a network location, in accordance with embodiments of the present invention;

FIG. 4 is a block diagram a first computing platform including an authentication NFT generator, in accordance with embodiments of the present;

FIG. 5 is a block diagram a second computing platform including a multifactor authentication application, in accordance with embodiments of the present;

FIG. 6 is a flow diagram of a method for multifactor user authentication using a multiple passkeys provided by multiple passkey holders and authentication NFT(s), in accordance with embodiments of the present invention FIG. 7 is a schematic diagram of a distributed trust computing network, in accordance with embodiments of the present invention;

FIG. 8 is a block diagram of an event object stored within a distributed ledger of a distributed trust computing network, in accordance with some embodiments of the present disclosure;

FIG. 9 is a schematic diagram of system for generating a Non-Fungible Token (NFT) and storing the NFT within a distributed trust computing network, in accordance with embodiments of the present invention; and FIG. 10 is a block diagram of an architecture for an exemplary NFT; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that implement multiple passkeys (e.g., bifurcated passkey or the like) and secure tokenization, such as a Non-Fungible Token (NFT) as factors in multifactor user authentication. In this regard, one or more authentication NFTs are generated that use some form of a user's authentication credentials (e.g., KYU/KYC data, biometric data, and the like) as the seed input for the NFT encryption/hash algorithm(s). In addition, passkeys are distributed to and/or made accessible to multiple users (e.g., the user being authenticated as well as one or more other users or, in other instances, multiple users other than the user being authenticated). The number of passkeys distributed and/or made accessible to the multiple users may be at the discretion of the user being authenticated.

In response to an event that requests multifactor authentication of the user, a plurality passkeys are requested, received and verified. Each of the passkeys being requested and received from, or at the directive of, one of the multiple users. In response to verifying the plurality of passkeys, at least one of the authentication NFTs is accessed and the cryptographic hash algorithm(s) is implemented to decrypt the authentication NFT(s) and identify the one or more user credentials. In response, the user is authenticated based at least on the user credentials that formed the basis for the authentication NFT(s).

In specific embodiments of the invention, receipt and verification of the passkeys prompts are determination as to whether volume or percentage passkey requirements or specific user requirements have been met before the authentication NFT(s) are accessed. For example, the passkeys may be required to be received/verified from a certain specified number of passkey holders or a certain percentage of the passkey holders. Moreover, in another specific example, one or more specific passkey holders may be required to be received and verified. In specific embodiments of the invention, the volume or percentage of passkey holders and/or the specific passkey holders may be determined dynamically at the time of the event requiring user authentication based on parameters associated with the event and/or timing of use of passkeys in previous multifactor user authentications.

In specific embodiments of the invention, a plurality of NFTs is generated that are associated with the user. In such embodiments of the invention each NFT may be associated with a passkey holder and/or a passkey. In specific such embodiments of the invention, each of the plurality of authentication NFTs are generated with a distinct portion of the user credentials as at least a portion of the input to the cryptographic NFT-generating algorithms. In such embodiments of the invention, during the authentication process, once the passkeys are received and verified, each of plurality of authentication NFTs are accessed, decrypted to identify their respective portion of the authentication credentials and the authentication credentials are subsequently assembled from the portions and used for purposes of authentication.

In other specific embodiments of the invention, the authentication NFT(s) may be stored either on a user's device, at a network location or on a private distributed trust computing network. In those embodiments in which the authentication NFT(s) are stored at a network location the network location may be included within the metadata stored at a private distributed trust network or identified within at least one of the received passkeys.

In still further specific embodiments of the invention, the authentication NFTs may be generated in a deactivated state. For example, the authentication NFTs may be further encrypted via a key wrapping process or the like. In such embodiments of the invention, the authentication NFTs are stored in the deactivated state and require activation, such as decryption, once the authentication NFTs have been accessed, for purposes of user authentication. In such embodiments of the invention, the authentication NFTs may remain in the activated state for a predetermined period of time or for a predetermined number of uses after which the authentication NFTs may automatically revert back to the deactivated state (e.g., automatically implement the key wrapping process or the like), while in other embodiments of the invention the user or some other entity must take an overt action to deactivate the authentication NFT.

Referring to FIG. 1, a schematic/block diagram is provided of a system 100 for multifactor user authentication implementing multiple passkeys provided by multiple passkey holders and Non-Fungible Token(s) (NFTs), in accordance with embodiments of the present invention. The system 100 includes a first computing platform 200 having a first memory 202 and one or more first processing devices 204 in communication with the first memory 202. First memory 202 stores authentication NFT generator 210 that includes one or more cryptographic algorithms 230 and is executable by one or more of the first processing devices 204. Authentication NFT generator 210 is configured to receive one or more user credentials 220, such as passkeys, Know-Your-User data, biometric data or the like, associated with a user and generate an authentication NFT 240 for the user using at least one of the one or more user credentials as the input to the one or more cryptographic hash algorithms 230 used to generate the authentication NFT 240).

In specific accordance with embodiments of the present invention, the authentication NFT 240 is either generated in the activated state or the deactivated state. In the activated state, a user can use the user credentials 220 of the authentication NFT 240 for purposes of authentication. Conversely, in the deactivated state, authentication NFT 240 is deemed to "locked" can not be used for purposes of authentication.

System 100 additionally includes second computing platform 300 having a second memory 302 and one or more second processing devices 304 in communication with the second memory 302. Second memory 302 stores multifactor authentication application 310 that is executable by one or more of the second processing devices 404. Multifactor authentication application 310 may be a standalone user authentication application used exclusively for authenticating a user using the authentication NFT 240 or the multifactor authentication application 310 may be part of any other application suitable for and/or requiring user authentication. In this regard, multifactor authentication application 310 may, in specific embodiments of the invention, be a pre-existing application that is revised to accommodate multifactor authentication using authentication NFT 240 or a multifactor authentication application 310 generated solely for purposes of multifactor user authentication using authentication NFT 240.

In response to an event that requires authentication of a user, multifactor authentication application 310 is configured to receive and verify a plurality of passkeys 330 (i.e., two or more passkeys). While two passkeys are commonly referred to as a bifurcated passkey or code, for purposes of the present invention a bifurcated passkey/code refers to any passkey/code that has multiple (two or more) components/passkeys. Each of the passkeys 330 are received from or at a directive of one of a plurality of passkey holders 340 (i.e., two or more passkey holders). In this regard, the user being authenticated, which may be an individual or an entity, will have previously authorized distribution (or passkey holder generation) of multiple passkeys 330 to two or more passkey holders 340 (which may or may not include the user). When an event that requires authentication of the user occurs, at least two of the passkey holders 340 must present and have their respective their respective passkeys 330 verified in order to satisfy the first part of the multifactor user authentication. In specific embodiments of the invention, the passkey 330 is a code (e.g., alphanumeric, numeric or the like), biometric data associated with the passkey holder (e.g., facial imagery, fingerprint or the like) or any other data that is possessed by the passkey holder. In other embodiments of the invention, the passkey holder 340 may not actually possess and/or have knowledge of the passkey 330 but rather the passkey holder 340 has access to a network location such as a distributed trust computing network or the like that stores the passkey 330 and is capable of directing the network storage location to communicate the passkey 330 to the multifactor authentication application 310.

In response to verifying the plurality of predetermined passkeys, multifactor authentication application 310 is configured to access at least one of the one or more authentication NFTs 240, implement the one or more cryptographic algorithms 230 to decrypt the at least one of the one or more authentication NFTs 240 and identify the one or more user credentials 230. Subsequently, multifactor authentication application 310 is configured to authenticate 350 the user based at least on the one or more user credentials 220.

Referring to FIG. 2, a schematic/block diagram is provided of a system 100-A for multifactor user authentication implementing multiple passkeys provided by multiple passkey holders and Non-Fungible Token(s) (NFTs), in accordance with embodiments of the present invention. The system includes both the first and second computing platforms 200, 300 shown and described in relation to FIG. 1. The system 100-A additionally includes a distributed trust computing network 400 that includes a plurality of first decentralized nodes 402. Each decentralized node 402 having a third memory (not shown in FIG. 2) and at least one third processing device (not shown in FIG. 2) that is in communication with the third memory. The third memory is configured to store one or more distributed ledgers 404 with each distributed ledger 404 comprising a plurality of linked data blocks associated with event objects 404-A (shown in FIG. 8).

In accordance with embodiments of the system 100-A, in response to authentication NFT generator 210 generating authentication NFT(s), distributed trust computing network 400 is configured to receive the authentication NFT 240 and/or metadata 242 associated with the authentication NFT 240. Once received, a plurality of the decentralized nodes 402 are configured to verify authenticity of the authentication NFT. Subsequently, the authentication NFT 240 and/or the metadata 242 associated with the NFT 240 is stored as a data block within one of the distributed ledgers 404. In specific embodiments of the invention, in which the authentication NFT 240 is stored on the distributed ledger 404 of the distributed computing network 400, the authentication NFT 240 is stored in a deactivated state (e.g., key wrapped or the like).

Referring to FIG. 2, a schematic/block diagram is provided of a portion of system 100-B for multifactor user authentication implementing multiple passkeys provided by multiple passkey holders and Non-Fungible Token(s) (NFTs), in accordance with embodiments of the present invention. The second computing platform 300 is included within system 100-B but not depicted in FIG. 3 for purposes of brevity. System 100-B highlights various options for storing the authentication NFT 242, in accordance with various embodiments of the invention. In specific embodiments of the invention, authentication NFT 240 may be stored on a distributed ledger 104 of a distributed trust computing network 402. Since the authentication NFT 240 requires access for purposes of using the authentication NFT 240 to authenticate the associated user, authentication NFT may be stored within layer two of the distributed trust computing network 400, which allows for access/changes to the data stored thereon. In additional embodiments of the invention, the authentication NFT 240 is stored on the distributed trust computing network 400 in a deactivated state. For example, the deactivated state may require that the authentication NFT 240 be key wrapped with additional encryption (i.e., encryption other than the hash algorithms 230 used to generate the authentication NFT 240), such that the authentication NFT requires decryption (i.e., activation) in order to use the authentication NFT 240 for purposes of authentication.

In other embodiments of the invention, authentication NFT 240 is stored external to the distributed trust computing network 400. For example, the authentication NFT 240 may be stored at a network location 500 or within the passkey holder device 600. In those embodiments in which the authentication NFT 240 is be stored at a network location 500 or within the passkey holder device 600, the metadata 242 stored within the distributed ledger 404 of the distributed trust computing network 400 includes the network location address 502 and/or the device identifier 602.

Referring to FIG. 4, a block diagram is presented of first computing platform 200 configured generating an authentication NFT, in accordance with embodiments of the present invention. In addition to providing greater details of the first computing platform 200, FIG. 4 highlights various alternate embodiments of the invention. The first computing platform 200 may comprise one or multiple devices, such as servers or the like that are in wired and/or wireless communication with one another. First computing platform 200 includes first memory 202, which may comprise volatile and non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 also includes one or more first processing devices 204, which may be an application-specific integrated circuit ("ASIC"), or other chipset, logic circuit, or other data processing device. First processing device(s) 204 may execute one or more application programming interface (APIs) 206 that interface with any resident programs, such as authentication NFT generator 210 or the like, stored in first memory 202 of first computing platform 200 and any external programs. First processing devices(s) 204 may include various processing subsystems (not shown in FIG. 4) embodied in hardware, firmware, software, and combinations thereof, that enable the functionality of first computing platform 200 and the operability of first computing platform 200 on a network, such as the Intranet, cellular network(s) and the like. For example, processing subsystems allow for initiating and maintaining communications and exchanging data with other networked devices. For the disclosed aspects, processing subsystems of first computing platform 200 may include any subsystem used in conjunction with authentication NFT generator 210 and related tools, routines, sub-routines, algorithms, sub-algorithms, sub-modules thereof.

In specific embodiments of the present invention, first computing platform 200 may additionally include a communications module (not shown in FIG. 4) embodied in hardware, firmware, software, and combinations thereof, that enables electronic communications between the first computing platform 200 and other networks and network devices, such as first distributed trust computing network 400, second computing platform 300 and the like. Thus, communication module may include the requisite hardware, firmware, software and/or combinations thereof for establishing and maintaining a network communication connection with one or more devices and/or networks.

First memory 402 of first computing platform 400 stores authentication NFT generator 410 that is executable by one or more of the first processing devices 404. Authentication NFT generator 410 includes one or more cryptographic NFT algorithms 230 that are configured to generate one or more authentication NFTs 240. Specifically, as previously discussed in relation to FIG. 5, authentication NFT generator 210 is configured to receive user credentials 220, such as KYU/KYC data 220 (otherwise referred to as out-of-wallet data), biometric data 224, passcodes 226 and the like. In additional embodiments of the invention, authentication NFT generator 210 is configured to receive conventional resources 250 such as an image file 250-A, an audio file 250-B, or multimedia file 250-C. Authentication NFT generator 210 is further configured to generate an authentication NFT 240 for the user using at least one of the one or more user credentials 220, and, in some embodiments of the invention, resources 250 as the input to the authentication NFT algorithm(s) 440.

In specific embodiments of the invention, multiple authentication NFTs 240 are generated. In one such embodiment of the invention, each authentication NFT 240 is assigned to one of the passkey holders 340, such that presentation of the passkey 330 held by a respective passkey holder 340 results in accessing the passkey holder's 340 respective assigned authentication 240. In such embodiments of the invention, each of the multiple authentication NFTs 240 may be generated using one or more of the user credentials 220 as the input or a portion of the one or more user credentials (i.e., different ones of the user credentials or separate parts of one single user credential) may be used as the input to the cryptographic NFT algorithms 230. In those embodiments of the invention, in which each of the multiple authentication NFTs use a portion of the user credentials 220 as the input/seed to the algorithms 230, during authentication the portions may require assembly or re-assembly to identify the user credentials 220. In other words, the portions of the user credentials 220 used as seeds/inputs to the algorithms 230 act as puzzle pieces which subsequently require that they be put back together/assembled to identify the entirety of the user credential 220.

In accordance with specific embodiments of the present invention, the authentication NFT 240 is either generated in an activated state or a deactivated state. In specific embodiments of the invention, in which the authentication NFT 240 is key wrapped when in the deactivated state 264, authentication NFT generator 210 or some ancillary application/module includes authentication NFT deactivator 260. Authentication NFT deactivator 260 includes one or more encryption algorithms 262, such as key wrapping algorithm(s) 262-1 or the like that are configured to automatically, upon authentication NFT 240 generation, apply the encryption algorithm(s) 260 to the authentication NFT(s) 240 to place the authentication NFT(s) 240 in a deactivated state 264.

In alternate embodiments of the invention, in which the authentication NFT generator 210 generates the authentication NFT 240 in an activated state 270, e.g., un-encrypted or the like, authentication NFT generator 210 further includes an authentication NFT communicator 280 that is configured to communicate a de-activation notice 282 to the user 290, which requires that the user de-activate the authentication NFT 240 prior to storing the authentication NFT 240 on a distributed ledger 404 within the distributed trust computing network 400. In specific embodiments of the invention, in which the de-activated state 264 provides for the authentication NFT 240 to be encrypted, the user activates authentication NFT deactivator 260 for purposes of applying one or more encryption algorithms 262 to the authentication NFT 240 to encrypt the authentication NFT 240.

It should be noted that in those embodiments of the invention in which the authentication NFT 240 is in the deactivated state 262, one or more of the decentralized nodes 402 of the first private distributed trust computing network 400 may store or have access to the key(s) or other means for activating the authentication NFT(s) 240 (i.e., decrypting/encrypting the authentication NFT(s) 240). For example, the authentication NFT 240 may require decryption in order to perform the validation/authentication process and, once validated/authenticated, may require encryption prior to creating a data block/event object 404-A (shown in FIG. 8) within a corresponding distributed ledger 404.

In still further embodiments of the invention, the authentication NFT 240 is received by the distributed trust computing network 400 in an activated state 270 and, after successful validation/authentication by a consensus of the decentralized notes 402, one or more of the decentralized nodes 402 is configured to de-activate 264 the authentication NFT(s) 240 by encryption (i.e., applying one or more encryption algorithms 262 to the authentication NFT(s) 240, prior to creating a data block/event object 404-A (shown in FIG. 8) within a corresponding distributed ledger 404.

Referring to FIG. 5, a block diagram is presented of second computing platform 300 configured multifactor authentication of a user implementing multiple passkeys and authentication NFT(s), in accordance with embodiments of the present invention. In addition to providing greater details of the second computing platform 300, FIG. 7 highlights various alternate embodiments of the invention. Second computing platform 300 may comprise one or multiple devices that are in wired and/or wireless communication with one another. Second computing platform 300 includes second memory 302, which may comprise volatile and non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, second computing platform 300 also includes one or more second processing devices 304, which may be an application-specific integrated circuit ("ASIC"), or other chipset, logic circuit, or other data processing device. Second processing device(s) 304 may execute one or more application programming interface (APIs) 306 that interface with any resident programs, such as user multifactor authentication application 310 or the like, stored in second memory 302 of second computing platform 300 and any external programs. Second processing devices(s) 304 may include various processing subsystems (not shown in FIG. 5) embodied in hardware, firmware, software, and combinations thereof, that enable the functionality of second computing platform 300 and the operability of second computing platform 300 on a network, such as the Intranet, cellular network(s) and the like. For example, processing subsystems allow for initiating and maintaining communications and exchanging data with other networked devices. For the disclosed aspects, processing subsystems of second computing platform 300 may include any subsystem used in conjunction with multifactor authentication application 310 and related tools, routines, sub-routines, algorithms, sub-algorithms, sub-modules thereof.

In specific embodiments of the present invention, second computing platform 300 may additionally include a communications module (not shown in FIG. 5) embodied in hardware, firmware, software, and combinations thereof, that enables electronic communications between the second computing platform 300 and other networks and network devices, such as distributed trust computing network 400, first computing platform 200 and the like. Thus, communication module may include the requisite hardware, firmware, software and/or combinations thereof for establishing and maintaining a network communication connection with one or more devices and/or networks.

Second memory 302 of second computing platform 300 stores multifactor authentication application 310. As previously discussed, multifactor authentication application 310 may be a standalone application specifically used for multifactor authentication or multifactor authentication application 310 may be incorporated within another application (i.e., a sub-component) that requires multifactored authentication. In this regard, the multifactored and/or elevated authentication may include, but is not limited to, (i) a user identification and/or password reset to a device or account, (ii) a new account request or new device setup, (iii) a resource exchange event (e.g., payment transaction) that exceeds a predetermined resource exchange amount (e.g., payment amount), (iv) detection of suspicious activity surrounding a resource exchange event (e.g., payment transaction), (v) a request for a new or refresh of an existing Virtual Private Network (VPN) certificate, and (vi) a request for access, typically temporary, to privileged data or privileged functionality within an application or service. In specific embodiments of the invention, the user must initiate authentication using the authentication NFT (in other words, entities other than the user can not require or request that the user authenticate via the authentication NFT).

As discussed in relation to FIG. 1, in response to a user authentication request 320, multifactor authentication application 310 is configured to receive and verify a plurality of passkeys 330 (i.e., two or more passkeys). While two passkeys are commonly referred to as a bifurcated passkey or code, for purposes of the present invention a bifurcated passkey/code refers to any passkey/code that has multiple (two or more) components/passkeys. Each of the passkeys 330 are received from or at a directive of one of a plurality of passkey holders 340 (i.e., two or more passkey holders). In this regard, the user being authenticated, which may be an individual or an entity, will have previously authorized distribution (or passkey holder generation) of multiple passkeys 330 to two or more passkey holders 340 (which may include the user 340-1 and other 340-2 individuals or entities or just other 340-2 individuals or entities). When an event that requires multifactor authentication of the user occurs, at least two of the passkey holders 340 must present and have their respective their respective passkeys 330 verified in order to satisfy the first part of the multifactor user authentication. In specific embodiments of the invention, the passkey 330 is a code (e.g., alphanumeric, numeric or the like), biometric data associated with the passkey holder (e.g., facial imagery, fingerprint or the like) or any other data that is possessed by the passkey holder. In specific embodiments of the invention, in which the NFT is stored at the distributed trust computing network 400 or at the network location, one or more of passkeys 340 is coded so as to provide for the NFT network location address 332 or/distributed trust ledger/block location 334.

In other embodiments of the invention, the passkey holder 340 may not actually possess and/or have knowledge of the passkey 330 but rather the passkey holder 340 has access to a network location such as a distributed trust computing network or the like that stores the passkey 330 and is capable of directing the network storage location to communicate the passkey 330 to the multifactor authentication application 310.

In other specific embodiments of the invention, multifactor authentication application 310 is configured to determine that predefined passkey criteria 360 has been met prior to accessing the authentication NFT(s) 240. The passkey criteria 360 may include, but is not limited to, volume or percentage of passkeys requirements 360-1 that require a specific number of passkeys to be received and verified or require a certain percentage of distributed passkeys to be received and verified. Additionally, passkey criteria 360 may include a specific passkey holder requirements 360-2 that require that the passkey(s) assigned to specific passkey holder(s) (e.g., a parent, a trustee or the like) be received and verified. In other specific embodiments of the invention, the passkey criteria 360, such as volume or percentage of passkeys requirements 360-1 and/or specific passkey holder requirements 360-2 is determined dynamically at the time of the authentication request. Such dynamic determination 362 may be made based on authentication event parameters 364 (e.g., location of the event, time of the event, type of event, parties participating in the event, resource volume required to conduct the event and the like) and/or prior passkey use

366 (e.g., period of time from last use of the passkey, frequency rate of use and the like).

In response to verifying the plurality of predetermined passkeys, multifactor authentication application 310 is configured to access at least one of the one or more authentication NFTs 240, implement the one or more cryptographic algorithms 230 to decrypt the at least one of the one or more authentication NFTs 240 and identify the one or more user credentials 230. As previously discussed, the authentication NFTs 240 may be accessed for a distributed trust computing network 400, a network location 500 of a passkey holder device 600. In those embodiments of the invention, in which each passkey 330 is associated with a separate authentication NFT 240, one or all of the authentication NFT(s) 240 may be required to be accessed. In this regard, if all of the authentication NFTs comprises the same user credentials 230, only one of the authentication NFTs need to be accessed. However, if the authentication NFTs comprise different user credentials 230 or different distinct portions 232 (e.g., puzzle pieces) of the user credentials, more than one, and in some instances all, of the associated separate authentication NFTs will be required to be accessed.

Subsequently, multifactor authentication application 310 is configured to authenticate 350 the user based at least on the one or more user credentials 220.

Referring to FIG. 6, a flow diagram is presented of a method 700 for multifactor user authentication, in accordance with embodiments of the present invention. At Event 710, user credentials, such as biometric data, KYU/KYC data, passkeys or the like that are associated with a user are received and verified. In additional embodiments of the method, conventional NFT resources, such as an image file, an audio file or a multimedia file is additionally received.

At Event 720, one or more authentication NFTs are generated for the user using at least the user credentials as the input/seed to the cryptographic/has NFT-generating algorithm(s). In alternate embodiments of the invention, in which the conventional NFT resources are received, the conventional NFT resources may also be used as the input/seed to the authentication NFT-generating algorithms. In specific embodiments of the invention, in which the authentication NFT(s) is stored on a distributed trust computing network, the authentication NFT(s) may be generated in an activated state or in a deactivated state. In those embodiments of the invention in which the authentication NFT is generated in an activated state, the authentication NFT(s) may be deactivated prior to communicating the authentication NFT to the distributed trust communication network. Such deactivation may require an input from the user.

In response to a request for multifactor authentication of the user, at Event 730, a plurality of predetermined passkeys is received and verified. Each passkey is received from, or at the directive of, a different passkey holder. The different passkey holders from which passkeys are received may include the user being authenticated or may not include the user being authenticated. In specific embodiments of the invention, verification of the passkeys includes determining that passkey criteria has been made, such as volume or percentage of passkeys criteria/requirements and/or specific passkey/passkey holder criteria/requirements. In specific embodiments of the invention, the passkey criteria is determined dynamically at the time of the authentication request based on parameters associated with the event requiring multifactor user authentication and/or prior passkey usage.

In response to verifying the passkeys, at Event 740, the authentication NFT(s) is/are accessed and the cryptographic has algorithm(s) is/are implemented to decrypt the authentication NFT(s) so as to identify the user credential(s). As previously noted, the authentication NFTs may be accessed from a distributed trust computing network, a network location or passkey holder device. In specific embodiments of the invention, multiple authentication NFTs may be accessed as a means of identifying the user credentials.

In response to identifying the user credentials, at Event 750, the user is authenticated using at least the identified user credential(s).

Referring to, FIGS. 7 and 8 illustrate an exemplary distributed ledger technology (DLT) architecture implemented in a distributed trust computing network (commonly referred to as a "blockchain" network), in accordance with embodiments of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or as is the case in the present invention, a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 7, an exemplary distributed trust computing network 400 includes a distributed ledger 404 being maintained on multiple devices (nodes) 402 that are authorized to keep track of the distributed ledger 404. For example, the nodes 402 may be one or more computing devices such as a comprehensive computing system and one or more client device(s). Each node 402 in the distributed trust computing network 400 may have a complete or partial copy of the entire distributed ledger 404 or set of events and/or event objects 404-A on the distributed ledger 404. Events are initiated at a node and communicated to the various nodes in the distributed trust computing network 400. Any of the nodes 402 can validate an event, record the event to its copy of the distributed ledger 404, and/or broadcast the event, the validation of the event (in the form of an event object) and/or other data to other nodes 402.

FIG. 8 depicts an exemplary event object 404-A. In embodiments of the present invention the event is generation of an NFT and the event object may store the NFT 240 and/or metadata 242 associated with the NFT 240. Event object 404-A includes an event header 406 and an event object data 408. The event header 406 may include a cryptographic hash of the previous event object 406-A; a nonce 406-B, i.e., a randomly generated 32-bit whole number; a cryptographic hash of the current event object 406-C wedded to the nonce 406-B; and a time stamp 406-D. The event object data 408 may include event information 408-A being recorded, such as NFT 240. Once the event object 404-A is generated, the event information 408-A is considered signed and forever tied to its nonce 406-B and hash 406-C. Once generated, the event object 404-A is then deployed on the distributed ledger 404. At this time, a distributed ledger address is generated for the event object 404-A, i.e., an indication of where the event object is located on the distributed ledger 404 and captured for recording purposes. Once deployed, the event information 408-A is considered recorded in the distributed ledger 404.

FIG. 9 illustrates an exemplary process of generating a secure token, such as a Non-Fungible Token (NFT) 240, in accordance with embodiments of the invention. One of ordinary skill in the art will readily appreciate that an NFT is a cryptographic record (referred to as a "token") that is linked to resources, such as user credentials, digital objects or the like. Authentication NFT 240 may be stored on a distributed ledger 404 of a distributed trust computing network 100. However, according to embodiments of the invention, authentication NFT 240 may be stored external from the distributed trust computing network, such as at a network location or at a user's device. In such embodiments of the invention, in which authentication NFT 240 is stored external from the distributed trust computing network, metadata 242 associated with authentication NFT 240 is stored on the distributed ledger 404. The storage of the NFT on the distributed ledger 404 or the storage of the metadata 242 means that various nodes 402 of the distributed trust computing network 400 have reached a consensus as to the ownership and validity/authenticity of authentication NFT 240, i.e., the linked data.

As shown in FIG. 9, to generate, otherwise referred to as "minting" authentication NFT 240, a user (e.g., NFT owner) may identify, using a user input device 202, resources 250 that the user wishes to mint as an NFT. Typically, the resources 250 used to generate the NFTs are digital objects that represent both tangible and intangible objects. These resources 250 may include a piece of art, music, collectible, virtual world items, videos, real-world items such as artwork and real estate, or any other presumed valuable object. According to embodiments of the present invention user credentials 220 (not shown in FIG. 9) are either part of the resources or also used to generate the authentication NFT 240. These resources 250 and user credentials 220 are then digitized into a proper format to generate the NFT 206. Authentication NFT 240 may be a multi-layered documentation that identifies the resources 250 and user credentials 220 but also evidences various event conditions associated therewith.

To record authentication NFT 240 and/or authentication NFT metadata 242 in a distributed ledger 404, an event object 404-A for the authentication NFT 240 is created using data stored in database 804. As previously discussed in relation to FIG. 8, the event object 404-A includes an event object header 406 and an event object data 408. The event object header 406 includes a cryptographic hash of the previous event object, a nonce (i.e., a random 32-bit whole number generated when the event object is created), a cryptographic hash of the current event object wedded to the nonce, and a time stamp. The event object data 408 includes the authentication NFT 240 and/or metadata 242 being recorded. Once the event object 404-A is generated, authentication NFT 240 is considered signed and persistently tied to its corresponding nonce and hash. The event object 404-A is then deployed in the distributed ledger 404. At this time, a distributed ledger address is generated for the event object 404-A, i.e., an indication of where authentication NFT 240 is located on the distributed ledger 404 and captured for recording purposes. Once deployed, authentication NFT 240 is linked permanently to the corresponding hash and the distributed ledger 404, and is considered recorded in the distributed ledger 404, thus concluding the generation/minting process.

As shown in FIG. 9 and previously discussed in relation to FIG. 7, the distributed ledger 404 may be maintained on multiple devices (nodes) 402 of the distributed trust computing network 400; the multiple nodes 402 are authorized to keep track of the distributed ledger 404. For example, the multiple nodes 404 may be computing devices such as a computing system or end-point device(s). Each node 402 may have a complete or partial copy of the entire distributed ledger 404 or set of events and/or event objects on the distributed ledger 404. Events, such as the recordation of authentication NFT 240, are initiated at a node 402 and communicated to the various nodes 402. Any of the nodes 402 can validate an event, record the event to the corresponding copy of the distributed ledger 404, and/or broadcast the event, its validation (in the form of an event object 404-A) and/or other data to other nodes 402.

FIG. 10 illustrates an exemplary authentication NFT 240 as a multi-layered documentation of a resource 250, in accordance with an embodiment of an invention. As shown in FIG. 10, the NFT 240 may include at least relationship layer 242, a token layer 244, a metadata layer 246, and, when applicable, a licensing layer 248. The relationship layer 242 may include ownership information 242-1, including a map of various users that are associated with the resource and/or the NFT 240, and their relationship to one another. For example, if the NFT 240 is acquired by user U1 from a user U2, the relationship between U1 and U2 is recorded in the relationship layer 242. In another example, if the NFT 240 is owned by O1 and the resource itself is stored in a storage facility by storage provider SP1, then the relationship between O1 and SP1 as owner-file storage provider is recorded in the relationship layer 242. The token layer 244 may include a token identification number 244-1 that is used to identify the NFT 206. The metadata layer 246 may include at least a resource location 246-1 and a resource descriptor 246-2. The resource location 246-1 provides information associated with the specific location of the resource 250. Depending on the conditions listed in the smart contract underlying the distributed ledger 404, the resource 250 may be stored on-chain, i.e., directly on the distributed ledger 404 along with the NFT 240, or off-chain, i.e., in an external storage location. The resource location 246-1 identifies where the resource 250 is stored. The resource descriptor 246-2 includes specific information associated with the resource itself. For example, the resource descriptor 246-2 may include information about the supply, authenticity, lineage, provenance of the resource 250. The licensing layer 248 may include any transferability parameters 248-1 associated with the NFT 240, such as restrictions and licensing rules associated with purchase, sale, and any other types of transfer of the resource 250 and/or the NFT 240 from one person to another. Those skilled in the art will appreciate that various additional layers and combinations of layers can be configured as needed without departing from the scope and spirit of the invention.

Thus, present embodiments of the invention provide for a multifactor user authentication leveraging secure tokenization, such as a Non-Fungible Token (NFT) and multiple passkeys (e.g., bifurcated passkey). One or more authentication NFTs are generated that use some form of a user's authentication credentials as the seed input for the NFT encryption/hash algorithm(s). In addition, passkeys are distributed to and/or made accessible to multiple passkey holders. In response to an event that requests multifactor authentication of the user, a plurality passkeys are requested, received and verified. Each of the passkeys being requested and received from, or at the directive of, one of the multiple passkey holders. In response to verifying the plurality of passkeys, at least one of the authentication NFTs is accessed and the cryptographic hash algorithm(s) is implemented to decrypt the authentication NFT(s) and identify the one or more user credentials. In response, the user is authenticated based at least on the user credentials that formed the basis for the authentication NFT(s).

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for multifactor authentication of a user, the system comprising:
  a first computing platform including a first memory and one or more first processing devices in communication with the first memory, wherein the first memory stores an authentication Non-Fungible Token (NFT) generator, which includes one or more cryptographic NFT-generating algorithms, is executable by at least one of the one or more first processing devices and configured to:
    receive one or more user credentials associated with the user, and
    generate one or more authentication NFTs for the user, wherein the one or more authentication NFTs are generated using the one or more user credentials as at least a portion of an input to the one or more cryptographic NFT-generating algorithms; and
  a second computing platform including a second memory and one or more second processing devices in communication with the second memory, wherein the second memory stores a multifactor authentication application that is executable by at least one of the one or more second processing devices and configured to:
    in response to a request for authentication of the user, receive and verify a plurality of predetermined passkeys, each of the plurality of predetermined passkeys received from or at a directive of one of a plurality of passkey holders,
    in response to verifying the plurality of predetermined passkeys, access at least one of the one or more authentication NFTs, implement the one or more cryptographic algorithms to decrypt the at least one of the one or more authentication NFTs and identify the one or more user credentials, and
    authenticate the user based at least on the one or more user credentials.

2. The system of claim 1, wherein the multifactor authentication application is further configured to:
  receive and verify the plurality of predetermined passkeys, each of the plurality of predetermined passkeys received from or at the directive of one of the plurality of passkey holders, the plurality of passkey holders is chosen from group consisting of (i) users other than the user being authenticated, and (ii) the user being authenticated and users other than the user being authenticated.

3. The system of claim 1, wherein the multifactor authentication application is further configured to:
  receive and verify the plurality of predetermined passkeys,
  determine that the received and verified predetermined password meet at least one chosen from the group comprising (i) passkey volume or percentage requirements, and (ii) specific passkey holder requirements, and
  in response to verifying the plurality of predetermined passkeys and determining that at least one of (i) and (ii) have been met, access the one or more authentication NFTs, implement the one or more cryptographic algorithms to decrypt the one or more authentication NFT and identify the one or more user credentials.

4. The system of claim 3, wherein the multifactor authentication application is further configured to:
  dynamically determine at least one of (i) the passkey volume or percentage requirements, and (ii) the specific passkey holder requirements based on at least one of (a) one or more parameters associated with an action prompting the multifactor authentication of the user, and (b) use of the predetermined passkeys in previous multifactor authentications of the user.

5. The system of claim 1, wherein the multifactor authentication application is further configured to:

receive the plurality of predetermined passkeys, wherein at least one of the passkeys is configured to identify at least one network location for accessing the at least one authentication NFT, and access the at least one authentication NFT based on the identified at least one network location.

6. The system of claim 1, wherein the authentication NFT generator is further configured to:

generate a plurality of authentication NFTs for the user, wherein each of the plurality of authentication NFTs is associated with one of the plurality of passkeys.

7. The system of claim 6, wherein the authentication NFT generator is further configured to:

generate the plurality of authentication NFTs for the user, wherein each of the plurality of authentication NFTs are generated using a distinct portion of the one or more user credentials as at least a portion of an input to the one or more cryptographic NFT-generating algorithms.

8. The system of claim 7, wherein the multifactor authentication application is further configured to:

receive and verify the plurality of predetermined passkeys, in response to verifying the plurality of predetermined passkeys, access the plurality of authentication NFTs, implement the one or more cryptographic algorithms to decrypt the plurality of authentication NFT, identify the distinct portions of the one or more user credentials, assemble the distinct portions of the one or more user credentials to identify the one or more user credentials.

9. The system of claim 1, further comprising:

a private distributed trust computing network comprising a plurality of decentralized nodes, each decentralized node having a third memory and at least one third processing device in communication with the third memory, wherein the third memory of the decentralized nodes is configured to store one or more distributed ledgers, each distributed ledger comprising a plurality of data blocks, wherein in response to receiving at least one of (i) the one or more authentication NFTs, and (ii) metadata associated with the one or more authentication NFTs, a plurality of the decentralized nodes are configured to verify authenticity of the one or more authentication NFTs, and store at least one of (i) the one or more authentication NFTs, and (ii) the metadata associated with the one or more authentication NFTs.

10. The system of claim 9, wherein the metadata associated with each of the one or more authentication NFTs includes a network location at which a corresponding one of the one or more authentication NFTs is stored.

11. The system of claim 10, wherein the multifactor authentication is application is further configured to:

access the one or more authentication NFTs by identifying at least one location on the private distributed trust computing network at which the metadata associated with the one or more authentication NFTs is stored, access the at least one location on the private distributed trust computing network to identify the network location at which the corresponding one of the one or more authentication NFTs is stored.

12. The system of claim 9, wherein the authentication NFT generator is further configured to:

generate the one or more authentication NFTs in a deactivated state, wherein the deactivated state is an encrypted state provided for by key wrapping the one or more authentication NFTs, and communicate the one or more authentication NFTs in the deactivated state to the private distributed trust computing network, wherein the private distributed trust computing network is configured to store the NFTs in the deactivated state.

13. The system of claim 12, wherein the multifactor authentication application is further configured to:

move the one or more authentication NFTs from the deactivated state to an activated state by decrypting the key wrapping of the one or more authentication NFTs.

14. A computer-implemented method for multifactor authentication of a user, the computer-implemented method is executed by one or more computing processor devices and comprises:

receiving one or more user credentials associated with the user;

generating one or more authentication NFTs for the user, wherein the one or more authentication NFTs are generated using the one or more user credentials as at least a portion of an input to one or more cryptographic NFT-generating algorithms;

in response to a request for authentication of the user, receiving and verifying a plurality of predetermined passkeys, each of the plurality of predetermined passkeys received from or at a directive of one of a plurality of passkey holders;

in response to verifying the plurality of predetermined passkeys, accessing the one or more authentication NFTs, implementing the one or more cryptographic algorithms to decrypt the one or more authentication NFT and identifying the one or more user credentials; and authenticating the user based at least on the one or more user credentials.

15. The computer-implemented method of claim 14, further comprising:

determining that the received and verified predetermined password meet at least one chosen from the group comprising (i) passkey volume or percentage requirements, and (ii) specific passkey holder requirements, and in response to verifying the plurality of predetermined passkeys and determining that at least one of (i) and (ii) have been met, accessing the one or more authentication NFTs, implementing the one or more cryptographic algorithms to decrypt the one or more authentication NFT and identifying the one or more user credentials.

16. The computer-implemented method of claim 14, wherein generating one or more authentication NFTS further comprises:

generating a plurality of authentication NFTs for the user, wherein each of the plurality of authentication NFTs is (i) associated with one of the plurality of passkeys and (ii) generated using a distinct portion of the one or more user credentials as at least a portion of an input to the one or more cryptographic NFT-generating algorithms, and wherein in response to verifying the plurality of predetermined passkeys, accessing the plurality of authentication NFTs, implementing the one or more cryptographic algorithms to decrypt the plurality of authentication NFT, identifying the distinct portions of the one or more user credentials, assembling the distinct portions of the one or more user credentials to identify the one or more user credentials.

17. The computer-implemented method of claim 14, wherein generating the one or more authentication NFTs further comprises:

generating the one or more authentication NFTs in a deactivated state, wherein the deactivated state is an encrypted state provided for by key wrapping the one or more authentication NFTs, and the computer-implemented method further comprises:

communicating the one or more authentication NFTs in the deactivated state to the private distributed trust computing network, wherein the private distributed trust computing network is configured to store the NFTs in the deactivated state.

18. A computer program product comprising:

a non-transitory computer-readable medium comprising sets of codes for causing one or more computing processing devices to:

receive one or more user credentials associated with the user;

generate one or more authentication NFTs for the user, wherein the one or more authentication NFTs are generated using the one or more user credentials as at least a portion of an input to one or more cryptographic NFT-generating algorithms;

in response to a request for authentication of the user, receive and verify a plurality of predetermined passkeys, each of the plurality of predetermined passkeys received from or at a directive of one of a plurality of passkey holders;

in response to verifying the plurality of predetermined passkeys, access the one or more authentication NFTs, implement the one or more cryptographic algorithms to decrypt the one or more authentication NFT and identify the one or more user credentials; and authenticate the user based at least on the one or more user credentials.

19. The computer program product of claim 18, wherein the sets of codes further cause the one or more computing processor devices to:

determine that the received and verified predetermined password meet at least one chosen from the group comprising (i) passkey volume or percentage requirements, and (ii) specific passkey holder requirements, and wherein the set of codes for causing the one or more computing devices to access the one or more authentication NFTs, implement the one or more cryptographic algorithms to decrypt the one or more authentication NFT and identify the one or more user credentials further cause the one or more computing device processors to, in response to verifying the plurality of predetermined passkeys and determining that at least one of (i) and (ii) have been met, access the one or more authentication NFTs, implement the one or more cryptographic algorithms to decrypt the one or more authentication NFT and identify the one or more user credentials.

20. The computer program product of claim 18, wherein the set of codes for causing the one or more computing processor device to generate one or more authentication NFTs further cause the one or more computing device processors to generate a plurality of authentication NFTs for the user, wherein each of the plurality of authentication NFTs is (i) associated with one of the plurality of passkeys and (ii) generated using a distinct portion of the one or more user credentials as at least a portion of an input to the one or more cryptographic NFT-generating algorithms, and wherein the set of codes for causing the one or more computing devices to access the one or more authentication NFTs, implement the one or more cryptographic algorithms to decrypt the one or more authentication NFT and identify the one or more user credentials further cause the one or more computing device processors to, in response to verifying the plurality of predetermined passkeys, accessing the plurality of authentication NFTs, implementing the one or more cryptographic algorithms to decrypt the plurality of authentication NFT, identifying the distinct portions of the one or more user credentials, assembling the distinct portions of the one or more user credentials to identify the one or more user credentials.

\* \* \* \* \*